United States Patent [19]
Molloy

[11] Patent Number: 6,058,388
[45] Date of Patent: *May 2, 2000

[54] IMPLEMENTATION OF ESCROW-LOCKING SCALAR QUANTITIES VIA PROCESS-PAIR RESOURCE MANAGERS

[75] Inventor: Mark E. Molloy, San Jose, Calif.

[73] Assignee: Compaq Computer Corporation, Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,850

[22] Filed: Jun. 16, 1997

[51] Int. Cl.$^7$ ...................................................... G06F 17/30
[52] U.S. Cl. ................................. 707/1; 707/201; 707/203
[58] Field of Search .................................. 707/1, 2, 201, 707/203

[56] References Cited

U.S. PATENT DOCUMENTS

| | | | |
|---|---|---|---|
| 5,568,639 | 10/1996 | Wilcox et al. | 395/600 |
| 5,586,039 | 12/1996 | Hirsch et al. | 364/461.01 |
| 5,596,745 | 1/1997 | Lai et al. | 395/614 |
| 5,613,060 | 3/1997 | Britton et al. | 395/182.13 |
| 5,701,480 | 12/1997 | Raz | 395/671 |
| 5,720,018 | 2/1998 | Muller et al. | 395/133 |
| 5,765,176 | 6/1998 | Bloomberg | 707/514 |
| 5,815,689 | 9/1998 | Shaw et al. | 395/551 |
| 5,828,384 | 10/1998 | Iwasaki et al. | 345/508 |
| 5,835,764 | 11/1998 | Platt et al. | 395/671 |

*Primary Examiner*—Anton W. Fetting
*Assistant Examiner*—Cheryl Lewis
*Attorney, Agent, or Firm*—Fenwick & West LLP

[57] ABSTRACT

The present invention is a scalar quantity implemented as a process-pair resource manager. The process-pair implementation includes a concurrent aspect and a serial aspect. The concurrent aspect provides an object-like interface to the scalar quantity. Threads and processes access the scalar quantity by passing messages to the concurrent aspect. The concurrent aspect adds a description of each message as well as the result of processing each message to a transaction record. At the conclusion of a transaction, the concurrent aspect passes the transaction record to the serial aspect. The serial aspect then replays the transaction, using the transaction record. If the replay of the transaction is consistent with the transaction as recorded in the transaction record, the serial aspect sends a message to the concurrent aspect voting to commit the transaction. In turn, the concurrent aspect sends a message to the transaction manager forwarding the commit message. In the event of process, processor, communication or system failure, the scalar quantity is always recoverable to reflect all, and only, committed transactions.

25 Claims, 3 Drawing Sheets

IMPLEMENTATION OF ESCROW-LOCKING SCALAR QUANTITIES VIA PROCESS-PAIR RESOURCE MANAGERS

RELATED APPLICATIONS

The disclosure of U.S. application Ser. No. 08/840,749, filed Apr. 16, 1997 entitled "Using Process-pairs as Transaction-Coordinated Resource Managers", pending by Mark Edward Molloy, filed Apr. 16, 1997, is incorporated in this document by reference.

FIELD OF THE INVENTION

The present invention relates generally to object-oriented and transaction processing computer systems. More specifically, the present invention is a method and apparatus for providing concurrent access to an escrow-locking scalar quantity.

BACKGROUND OF THE INVENTION

Objects, as used in the context of object-oriented programming, are programmatic combinations of data elements and methods. Each data element or method included in an object is either public or private. Public data elements and methods may be manipulated by entities that are external to the object. Private data elements and methods, on the other hand, are encapsulated and may only be manipulated by the object itself. In practice, a typical object includes some number of private data elements and some number of public methods for manipulating the private data elements.

Scalar quantities are objects that are similar to scalar values, such as integer or floating point values. In fact, scalar quantities typically encapsulate a scalar value as a private data element. Unlike scalar values, however, scalar quantities cannot be directly accessed. Instead, scalar quantities provide methods for adding to, or taking away from, the encapsulated scalar value. By restricting access to scalar quantities to these two methods, it becomes possible to provide concurrent access to scalar quantities in a controlled fashion. Simultaneously, it becomes possible to use a technique known as "escrow-locking" to ensure that scalar quantities act as "transaction protected resources."

To understand the role of scalar quantities as transaction protected resources, it is helpful to first understand the transaction abstraction. Fundamentally, a transaction is defined as a unit of work that is 1) "atomic," 2) "consistent," 3) "isolated," and 4) "durable" (more commonly, it is said that transactions have "ACID" properties).

To be "atomic" a transaction must complete in an all-or-none fashion. This means that transaction protected resources must reflect all changes made during a transaction that successfully complete or "commits." It also means that transaction protected resources must reflect none of the changes made during a transaction that fails to commit for any reason.

To be "consistent" a transaction must move transaction protected resources from one consistent state to another. In systems that use the transaction abstraction, consistent states are defined in terms of rules known as integrity constraints. Transactions that violate these integrity constraints are aborted. In this way, transaction protected resources are maintained in consistent states. For example, in a product inventory database, an integrity constraint could be used to abort any transaction that would result in a negative quantity of any product.

To be "isolated" the changes made to transaction protected resources must be invisible to threads and processes that are not associated with the transaction until the transaction has committed. Typically, isolation is achieved by locking the changed resource, forcing threads and processes that attempt to read the locked resource to wait until the transaction has completed.

Finally, to be "durable" the changes made to transaction protected resources must not be lost or corrupted, even in the case of a catastrophic system failure. In this context, durability is not used in the absolute sense. For example, physically destroying the transaction processing computer system and all of its backup records will violate the durability property.

Escrow-locking is the technique that allows scalar quantities to have ACID properties and act as transaction protected resources, without restricting update access to the scalar to a single transaction at a time. For escrow-locking, the scalar value included in a scalar quantity is replaced by a numeric range [m, n]. The numeric range [m, n] of a scalar quantity means that the value of the scalar quantity is between m and n, inclusive. Initially, the numeric range of a scalar quantity is set to be the value of the scalar quantity, i.e., m=n. Thereafter, if the scalar quantity's method for adding to is called to add x to the scalar quantity, the numeric range becomes [m, m+x]. Similarly, if the scalar quantity's method for taking away is called to subtract y from the scalar quantity, the numeric range becomes [m−y, m+x].

Transactions in which the scalar quantity participates are only allowed to commit if the required integrity constraints are valid for the numeric range included in the scalar quantity. In this way, a scalar quantity can participate in multiple concurrent transactions, maintain ACID properties for each transaction, and not cause any transaction to block. This combination of properties make scalar quantities highly useful programming objects. Unfortunately, traditional implementations of scalar quantities have generally been accomplished with less than ideal efficiency. As a result, there are cases where the use of scalar quantities is difficult or even impossible. Thus, a need exists for an efficient scalar quantities implementation that retains the advantages of traditional scalar quantities.

SUMMARY OF THE INVENTION

The present invention includes an escrow-locking scalar quantity. More specifically, the scalar quantity of the present invention is constructed as a process-pair resource manager having a serial aspect and a concurrent aspect. The serial aspect and the concurrent aspect are actually processes which are instances of the same program—they execute subsets of the same program instructions. After initialization, however, the serial aspect and the concurrent aspect assume different functional roles. The scalar quantity of the present invention also includes a durable image of the serial aspect in some between-transaction state; it does not have to be up-to-date. The durable image is known as a "passivated image," and may be used to reconstruct the serial aspect in a known state. The scalar quantity also includes a durable transaction record log, also used for reconstruction of the serial aspect.

The concurrent aspect and serial aspect of the escrow-locking scalar quantity encapsulate properties that define a minimum allowed value, a maximum allowed value, a current minimum potential value, a current maximum potential value, a per-transaction amount subtracted, and a per-transaction amount added. In combination with the encapsulated properties, the concurrent and serial aspects of the escrow-locking scalar quantity support operations to set the minimum allowed value, set the maximum allowed value, add to the scalar quantity, subtract from the scalar quantity, get the value of the scalar quantity, and set the value of the scalar quantity. Each of these operations is provided as a public method. Importantly, the add and subtract operations do not block other add and subtract operations.

Each thread or process that requires access to the scalar quantity does so as part of a transaction. Therefore, prior to accessing the scalar quantity, threads and processes initiate transactions by sending begin transaction messages to a transaction manager. This associates a transaction identifier with each thread or process. Subsequently, the threads or processes access the scalar quantity by sending request messages to the concurrent aspect to invoke the methods provided by the scalar quantity. The transaction identified associated with the thread/process is implicitly sent with the message. In response, the concurrent aspect sends reply messages back to the threads or processes.

The concurrent aspect constructs a transaction record for each transaction in which the scalar quantity participates. The transaction record for a transaction includes each request message received by the concurrent aspect and each reply message sent by the concurrent aspect during a particular transaction. The concurrent aspect responds to the first message received during a particular transaction by sending a message to the transaction manager causing the transaction manager to register the scalar quantity as a participant in that transaction.

As a transaction participant, the concurrent aspect is a recipient of the prepare, commit and rollback messages that are associated with transaction completion. To respond to a prepare message, the concurrent aspect evaluates the consistency of the scalar quantity by comparing the scalar quantity's minimum allowed value and minimum potential value. If the minimum potential value is less than the minimum allowed value, the concurrent aspect sends a message to the transaction manager voting to rollback the transaction. Similarly, if the scalar quantity's maximum potential value exceeds the maximum allowed value, the concurrent aspect sends a message to the transaction manager voting to rollback the transaction.

In cases where the scalar quantity's minimum potential value and maximum potential value are within the range defined by the scalar quantity's minimum allowed value and maximum allowed value, the concurrent aspect sends the transaction record for the relevant transaction to the serial aspect. The serial aspect then replays the transaction using the transaction record and re-evaluates the consistency of the scalar quantity. If the serial aspect determines that scalar quantity's minimum potential value and maximum potential value are within the range defined by the scalar quantity's minimum allowed value and maximum allowed value, the scalar aspect acts to commit the transaction.

To commit the transaction, the serial aspect sets the scalar quantity's minimum potential value to the sum of the minimum potential value and the amount that has been added to the scalar quantity during the transaction that is being committed. Similarly, the serial aspect sets the scalar quantity's maximum potential value to the difference of the maximum potential value and the amount that has been subtracted from scalar quantity during the transaction that is being committed. The serial aspect then concludes its commit processing by sending a message to the concurrent aspect indicating that the serial aspect has committed the transaction.

In the alternative, (i.e., when the serial aspect determines that scalar quantity's minimum potential value and maximum potential value are not within the range defined by the scalar quantity's minimum allowed value and maximum allowed value) the scalar aspect acts to rollback the transaction. To rollback the transaction, the serial aspect first sends a message to the concurrent aspect indicating that the serial aspect has rolled back the transaction. The serial aspect then concludes its rollback processing by aborting and recovering itself using the passivated serial image and transaction record log.

The commit and rollback processing performed by the serial aspect are replicated in the concurrent aspect. It should be noted, however, that commit processing is only performed by the concurrent aspect after the concurrent aspect has received notification from the transaction manager that the transaction has committed. This differs slightly from the commit processing performed by the serial aspect, which is performed as soon as the serial aspect has itself determined that the scalar quantity is in a consistent state. Rollback processing is also performed by the concurrent aspect after the concurrent aspect has received notification that the serial aspect has rolled back the same transaction (This is in addition to the previously described rollback processing performed by the concurrent aspect immediately after it has detected a consistency constraint failure). The rollback processing performed by the concurrent aspect also differs from the rollback processing performed by the serial aspect because the concurrent aspect may undo the effects of the transaction being rolled back in memory. This avoids the expense of aborting and recovering the concurrent aspect.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

ENVIRONMENT

Figure 1:
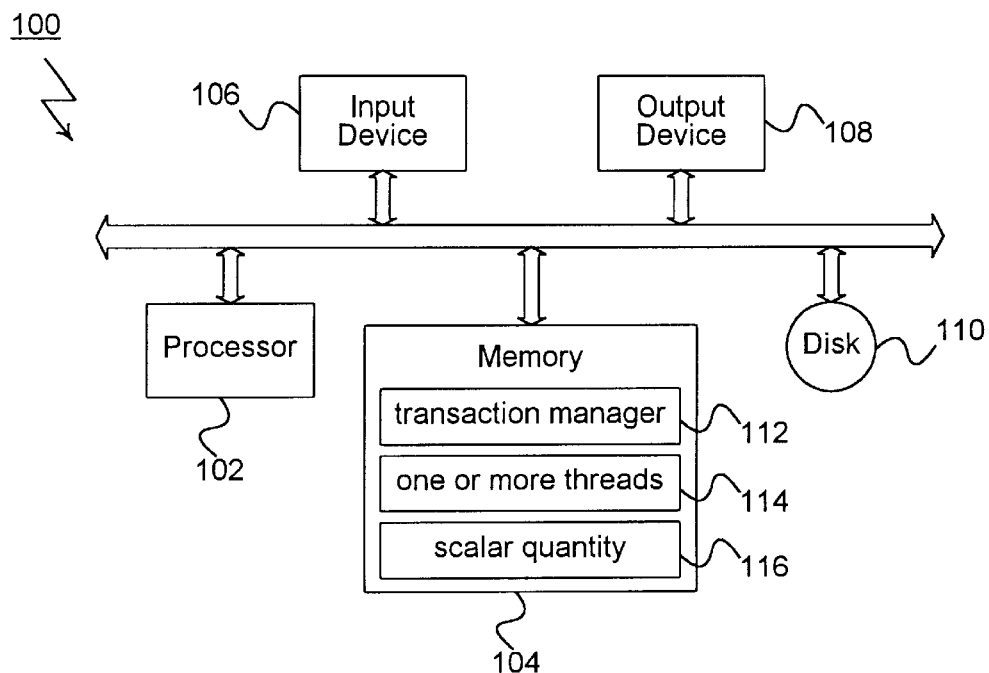
FIG. 1 is a block diagram of a host computer system in accordance with an embodiment of the present invention.

In FIG. 1, a host computer system 100 is shown as a representative environment for the escrow-locking scalar quantity of the present invention. Structurally, host computer system 100 includes a processor, or processors 102, and a memory 104. An input device 106 and an output device 108 are connected to processor 102 and memory 104. Input device 106 and an output device 108 represent a wide range of varying I/O devices such as disk drives, keyboards, modems, network adapters, printers and displays. Host computer system 100 also includes a disk drive 110 of any suitable disk drive type (equivalently, disk drive 110 may be any non-volatile storage system such as "flash" memory). A transaction manager 112, and one or more threads 114 are shown to be resident in memory 104 of host computer 100.

SCALAR QUANTITY

Figure 2:
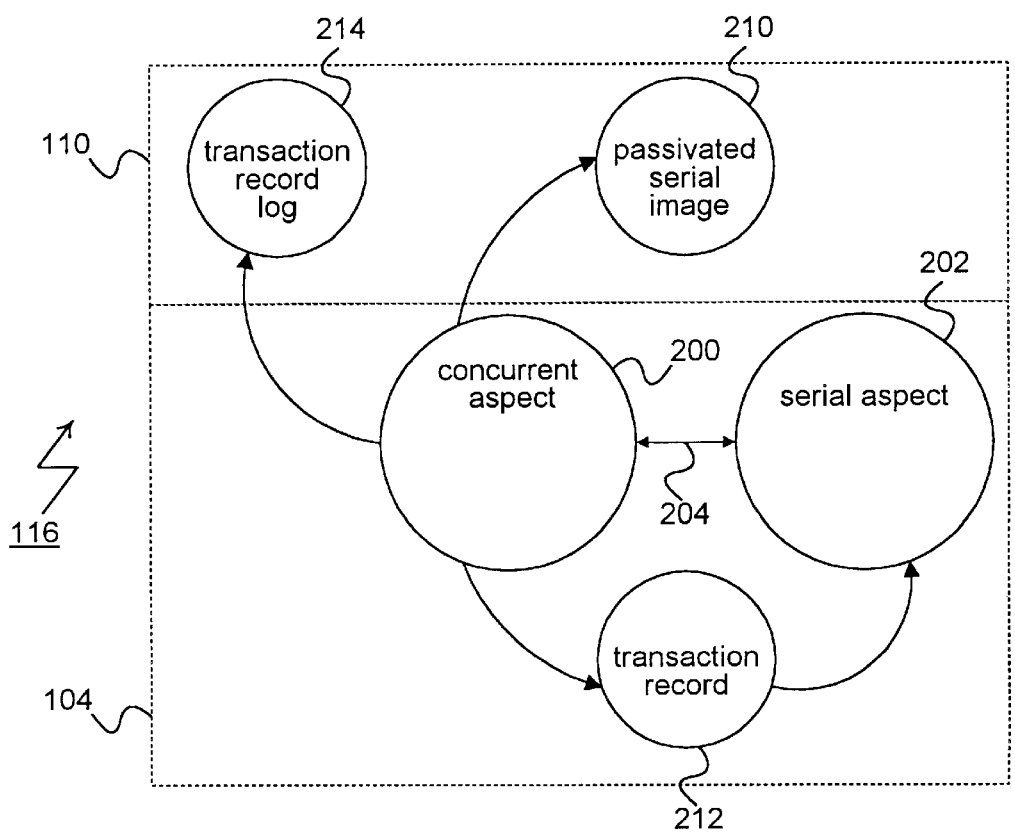
FIG. 2 is a block diagram of an escrow-locking scalar quantity in accordance with an embodiment of the present invention.

The present invention provides an escrow-locking scalar quantity that is implemented as a process-pair resource manager. In FIG. 1, the escrow-locking scalar quantity of the present invention is shown to be resident in memory 104 of host computer 100 and is designated 116. The major structural elements of a process-pair resource manager, of the type used to implement scalar quantity 116, are shown in FIG. 2 to include a concurrent aspect 200, a serial aspect 202, a communications link 204, a transaction record 212, a transaction record log 214, and a passivated serial aspect 210. The details of process-pair resource managers are more completely described in a co-pending U.S. application Ser. No. 08/840,749 entitled "Using Process-pairs as Transaction-Coordinated Resource Managers" by Mark Edward Molloy, filed Apr. 16, 1997, pending, the disclosure of which is incorporated in this document by reference.

Figure 3:
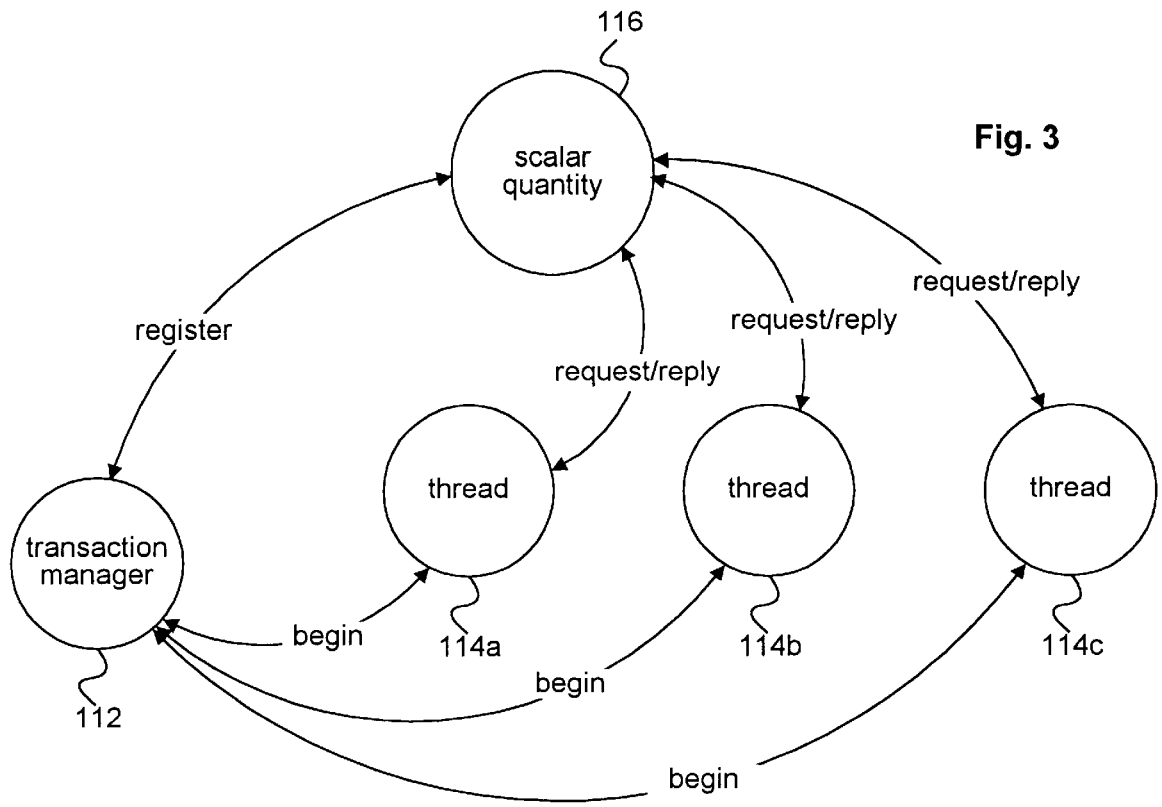
FIG. 3 is a block diagram showing the relation between the escrow-locking scalar quantity, transaction manager, and threads in accordance with an embodiment of the present invention.

As an object, scalar quantity 116 includes both properties and methods. To better understand the properties and methods included in scalar quantity 116, it is first necessary to appreciate the relationship between scalar quantity 116, threads 114 and transaction manager 112. More specifically, it may be appreciated that scalar quantity 116 is intended to provide concurrent access to multiple threads 114. This is shown more clearly in FIG. 3 where a representative scalar quantity 116 is shown in combination with three threads 114a through 114c. For the purposes of the present invention, however, each thread 114 is only allowed to access scalar quantity 116 as part of a separate transaction. As a result, each thread 114 is required to initiate a new transaction prior to accessing scalar quantity 116. In FIG. 3, this is represented by threads 114 sending begin transaction messages to transaction manager 112. Subsequently, threads 114 access scalar quantity 116 by sending request messages to scalar quantity 116. These messages include a range of different types. In particular, these messages include requests to add to, and to subtract from, the value of scalar quantity 116. In response, scalar quantity 116 sends reply messages back to threads 114.

Figure 4:
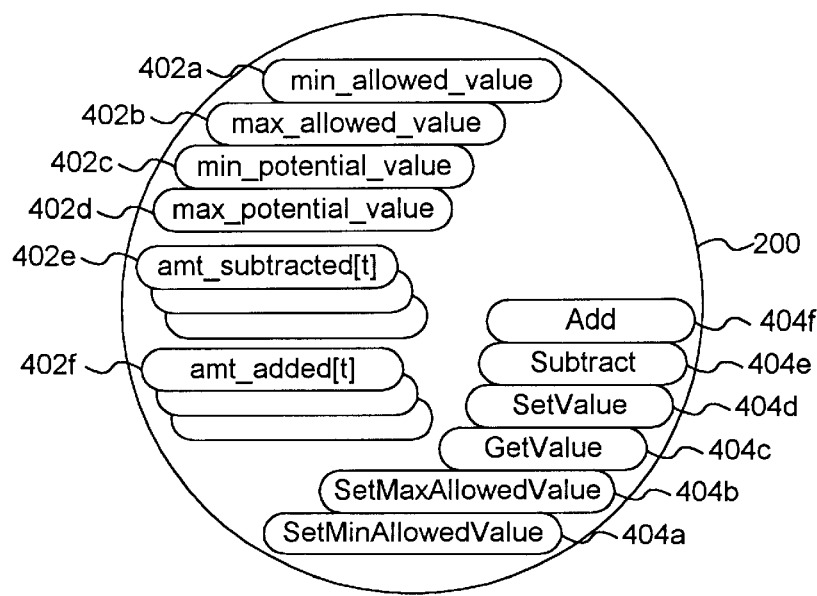
FIG. 4 is a block diagram showing the properties and methods of the escrow-locking scalar quantity in accordance with an embodiment of the present invention.

With the relationship between scalar quantity 116, threads 114 and transaction manager 112 in mind, the methods and properties of scalar quantity 116 may be explained by reference to FIG. 4. FIG. 4 shows that concurrent aspect 200 of scalar quantity 116 includes six properties 402a through 402f, and six methods 404a through 404f. The process-pair implementation of scalar quantity 116 means that separate copies of properties 402 and methods 404 are included in serial aspect 202. For the purposes of the immediate discussion, however, reference will be limited to concurrent aspect 200.

Property 402a, min_allowed_value, is the minimum allowed value for scalar quantity 116. Preferably, min_allowed_value 402a is initialized to have the smallest value that is consistent with the type of min_allowed_value 402a. Thus, if min_allowed_value 402a is a sixteen bit signed integer value, min_allowed_value 402a is initialized to have the smallest value possible for sixteen bit signed integers. Property 402b, max_allowed_value, is the maximum allowed value for scalar quantity 116. Preferably, max_allowed_value 402b is initialized to have the largest value that is consistent with the type of max_allowed_value 402b. Thus, if max_allowed_value 402b is a sixteen bit signed integer value, max_allowed_value 402b is initialized to have the largest value possible for sixteen bit signed integers. Together min_allowed_value 402a and max_allowed_value 402b define a numeric range of allowed values for scalar quantity 116.

At any given time, the actual value of scalar quantity 116 is dependent on a number of factors. These factors include transactions in which scalar quantity 116 has participated that have already committed. Transactions in which scalar quantity 116 is currently participating may also effect the value of scalar quantity 116. Property 402c, min_potential_value is the minimum value that scalar quantity 116 may currently have. Min_potential_value 402c reflects all transactions that have committed as well as the potential effect of all transactions in which scalar quantity 116 is currently a participant. Thus, min_potential value 402c is the smallest value that scalar quantity 116 could have due to any combination of commit/rollback outcomes of transactions which are in progress. Similarly, max_potential_value 402d reflects the operations of all committed transactions, as well as the potential effect of all transactions in which scalar quantity 116 is currently a participant. Thus, max_potential_value 402d is the largest value scalar quantity 116 could take on through any combination of commit/rollback outcomes of transactions which are in progress.

Concurrent aspect 200 includes an instance of property 402e amt_subtracted[t] for every transaction in which scalar quantity 116 is currently participating. For each such transaction, amt_subtracted[t] 402e records the cumulative amount that has been subtracted from scalar quantity 116 by that transaction. Concurrent aspect 200 also includes an instance of property 402f amt_added[t] for every transaction in which scalar quantity 116 is currently participating. For each such transaction, amt_added[t] 402f records the cumulative amount that has been added to scalar quantity 116 by that transaction.

Method 404a, SetMinAllowedValue, takes a numeric value argument and operates to set property 402a, min_allowed_value, equal to the numeric value argument. SetMinAllowedValue 404a requires exclusive access to scalar quantity 116. Therefore, SetMinAllowedValue 404a blocks until all other transactions in which scalar quantity 116 is a participant have completed. Subsequently, SetMinAllowedValue 404a compares the numeric value argument to value of properties 402b, max_allowed_value, and 402c, min_potential_value. If the numeric value argument is greater than max_allowed_value 402b (i.e., numeric value argument>max_allowed_value 402b) SetMinAllowedValue 404a returns false. If min_potential_value 402c is less than the numeric value argument (i.e., min_potential_value 402c<numeric value argument) SetMinAllowedValue 404a also returns false. Otherwise, SetMinAllowedValue 404a sets the value of min_allowed_value 402a to the value of the numeric value argument (i.e., min_allowed_value 402a ← numeric value argument) and returns true.

Method 404b, SetMaxAllowedValue, operates in a similar manner as SetMinAllowedValue 404a. In the case of SetMaxAllowedValue 404b, the numeric value argument is compared to value of properties 402a, min_allowed_value, and 402d, max_potential_value. If the numeric value argument is less than min_allowed_value 402a (i.e., numeric value argument<min_allowed_value 402a) SetMaxAllowedValue 404b returns false. If max_potential-value 402d is greater than the numeric value argument (i.e., max_potential_value 402d>numeric value argument) SetMaxAllowedValue 404b also returns false. Otherwise, SetMaxAllowedValue 404b sets the value of max_allowed_value 402b to the value of the numeric value argument (i.e., max_allowed_value 402b ← numeric value argument) and returns true.

Method 404c, GetValue, returns the current value of scalar quantity 116. To determine the value of scalar quantity 116, GetValue 404c blocks until all other transactions in which scalar quantity 116 is a participant have completed. At this point there are no outstanding transactions. As a result, property 402c, min_potential_value equals property 402d, max_potential_value. This value is returned.

Method 404d, SetValue, takes a numeric value argument and operates to set the value of scalar quantity 116 to be equal to the numeric value argument. SetValue 404d requires exclusive access to scalar quantity 116. Therefore, SetValue 404d blocks until all other transactions in which scalar quantity 116 is a participant have completed. Subsequently, SetValue 404d compares the numeric value argument to properties 402a, min_allowed_value, and 402b, max_allowed_value. If the numeric value argument is not within min_allowed_value 402a and max_allowed_value 402b (i.e., min_allowed_value 402a ≦ numeric value argument ≦ max_allowed_value 402b) SetValue 404d returns a value of false. Otherwise SetValue 404d then sets the value of property 402c, min_potential_value and property 402d, max_potential_value to be equal to the numeric value argument and returns a value of true.

Method 404e, Subtract, takes a numeric value argument. When called, Subtract 404e first determines if performing the requested subtraction would cause property 402c, min_potential_value to become less than property 402a, min_allowed_value (i.e., is (min_potential_value 402c - numeric value argument) <min_allowed_value 402a). If so, the requested subtraction could violate an integrity constraint and cause scalar quantity 116 to move to a non-consistent state. In these cases, Subtract 404e returns a value of false without performing the requested subtraction. Otherwise, Subtract 404e sets amt_subtracted[t] 402e to be the sum of amt_subtracted[t] 402e and the numeric value argument (i.e., amt_subtracted[t] 402e ← amt_subtracted[t] 402e+numeric value argument). Subtract 404e then sets min_potential_value 402c to be the difference of min_potential_value 402c and the numeric value argument (i.e., min_potential_value 402c ← min_potential_value 402c - numeric value argument), and returns a value of true.

Method 404f, Add, takes a numeric value argument. When called, Add 404f first determines if performing the requested addition would cause property 402d, max_potential_value, to become greater than property 402b, max_allowed_value (i.e., is (max_potential_value 402d+numeric value argument)>max_allowed_value 402b). If so, the requested addition could violate an integrity constraint and cause scalar quantity 116 to move to a non-consistent state. In these cases, Add 404f returns a value of false without performing the requested addition. Otherwise, Add 404f sets amt_added[t] 402f to be the sum of amt_added[t] 402f and the numeric value argument (i.e., amt_added[t] 402f ← amt_added[t] 402f+numeric value argument). Add 404f then sets max_potential_value 402d to be the sum of max_potential_value 402d and the numeric value argument (i.e., max_potential_value 402d ← max_potential_value 402d+numeric value argument), and returns a value of true.

Figure 5:
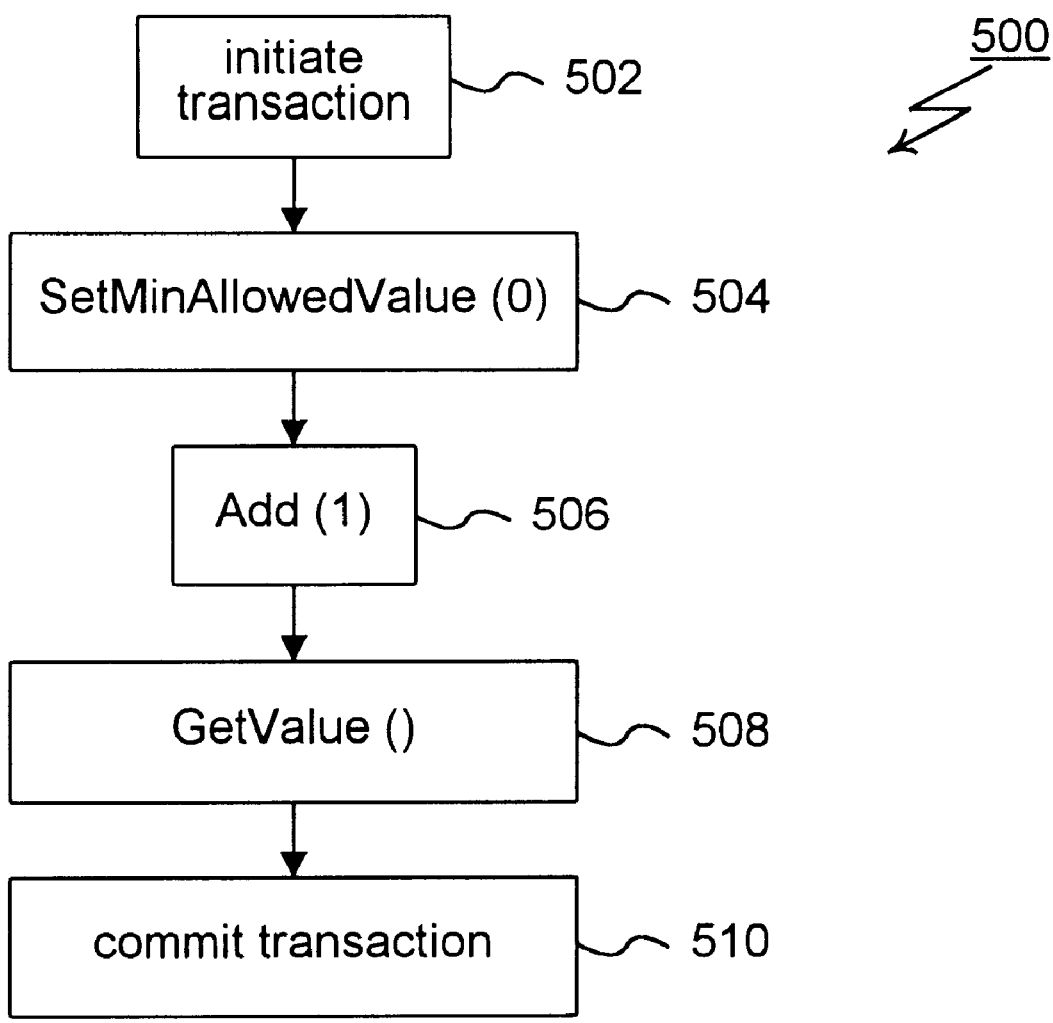
FIG. 5 is a flow chart showing an exemplary use of the escrow-locking scalar quantity in accordance with an embodiment of the present invention.

An exemplary use of scalar quantity 116 is shown as method 500 of FIG. 5. It should be appreciated that method 500 is intended to be exemplary in nature. In particular, it may be appreciated that methods 404 may be called in any order or repetition. Method 500 begins with step 502 where thread 114 initiates a transaction by sending a begin transaction message to transaction manager 112. Subsequently, in step 504, thread 114 calls SetMinAllowedValue 404a passing an argument of zero. In response, scalar quantity 116 sends a register message to transaction manager 112 to register scalar quantity 116 as a participant in the transaction initiated by thread 114 in step 502. The call to SetMinAllowedValue 404a then blocks until all other transactions in which scalar quantity 116 is a participant have completed. SetMinAllowedValue 404a then sets property 402a, min_allowed_value to equal to the numeric value argument zero (i.e., min_allowed_value 402a ← 0).

In step 506, thread 114 calls Add 404f with an argument of one. In response, scalar quantity 116 determines if performing the requested addition would cause property 402d, max_potential_value, to become greater than property 402b, max_allowed_value (i.e., is (max_potential_value 402d+1)>max_allowed_value 402b). If so, Add 404f returns a value of false. Otherwise, Add 404f sets property 402f, amt_added[t], to be the sum of amt_added[t] 402f and one (i.e., amt_added[t] 402f ← amt_added[t] 402f+1), increments max_potential_value 402d (i.e., max_potential_value 402d ← max_potential_value 402d+1), and returns a value of true.

In step 508, thread 114 follows the call to Add 404f with a call to GetValue 404c. As discussed, GetValue 404c requires exclusive access to scalar quantity 116. As a result, GetValue 404c blocks until all other transactions in which scalar quantity is participating have completed. GetValue 404c then returns the value of property 402c, min_potential_value plus the value of property 402f, amt_added[t] (min_potential_value 402c+amt_added [t] 402f). Equivalently, GetValue 404c may return the value of property 402d, max_potential_value minus the value of property 402e, amt_subtracted [t] (402d, max_potential_value - amt_subtracted [t] 402e).

Method 500 ends with step 510 where thread 114 completes the transaction initiated in step 502. To end this transaction, thread 114 sends a message to transaction manager 112 indicating that the transaction should either commit or rollback.

In cases where a commit message is sent, the transaction manager responds by sending a prepare message to concurrent aspect 200. On receipt of the prepare message, concurrent aspect 200 determines if the transaction that is committing will result in a consistent state for scalar quantity 116. In particular, concurrent aspect 200 requires 1) that min_allowed_value 402a ≦ max_allowed_value 402b and 2) that min_potential_value 402c+amt_added[t] 402f) ≦ (max_potential_value 402d- amt_subtracted[t] 402e).

Violation of these conditions indicates that the transaction requesting to commit would move scalar quantity 116 to a non-consistent state. Therefore, in such cases, concurrent aspect 200 votes to rollback the transaction and abandons the changes associated with the transaction. In the case where neither of the two integrity constraints would be violated by committing the transaction, concurrent aspect 200 forwards the transaction record 212 for the committing transaction to serial aspect 202.

On receipt of the transaction record 212, serial aspect 202 uses the contents of the transaction record 212 to replay the transaction. After replaying the transaction, serial aspect 202 evaluates the same integrity constraints already evaluated by concurrent aspect 200. If the evaluation of these conditions indicates that the transaction will move scalar quantity 116 to a consistent state, serial aspect 202 acts to commit the transaction. To commit the transaction, serial aspect 202 sets property 402c, min_potential_value, to be the sum of property 402c, min_potential_value, and property 402f, amt_added[t] (or, min_potential_value 402c ← min_potential_value 402c+amt_added[t] 402f). Serial aspect 202 also sets property 402d, max_potential_value, to be the difference of property 402d, max_potential_value, and property 402f, amt_subtracted[t] (or, max_potential_value 402d ← max_potential_value 402d -amt_subtracted[t] 402e). Serial aspect 202 then sends a message to concurrent aspect 200 indicating that it has committed the transaction. Alternatively, if either of the integrity constraints indicates that the transaction would move scalar quantity 116 to an inconsistent state, serial aspect 202 must rollback the transaction. Serial aspect 202 accomplishes rollback by abandoning the changes made during the transaction and sending a message to concurrent aspect 200 indicating that the serial aspect has rolled back the transaction.

Based on the foregoing, it may be appreciated that concurrent aspect 200 will receive a message from serial aspect 202 indicating that serial aspect has committed or rolled back the transaction. In the former case, concurrent aspect 200 sends a message to transaction manager 112 voting to commit the transaction. In the latter case, concurrent aspect 200 sends a message to transaction manager 112 voting to rollback the transaction.

After voting on the transaction, concurrent aspect 200 will receive another message from transaction manager 112. The message tells concurrent aspect 200 to commit or rollback the transaction. To respond to a message indicating that the transaction should commit, concurrent aspect 200 performs the same commit processing described for serial aspect 202. Namely, concurrent aspect 200 sets property 402c, min_potential_value, to be the sum of property 402c, min_potential_value, and property 402f, amt_added[t] (or, min_potential_value 402c ← min_potential_value 402c+amt_added[t] 402f). Concurrent aspect 200 also sets property 402d, max_potential_value, to be the difference of property 402d, max_potential_value, and property 402f, amt_subtracted[t] (or, max_potential_value 402d ← max_potential_value 402d - amt_subtracted[t] 402e).

To respond to a message to rollback the transaction, concurrent aspect 200 sets property 402c, min_potential_value, to be the sum of property 402c, min_potential_value, and property 402e, amt_subtracted[t] (or, min_potential_value 402c ← min_potential_value 402c+amt_subtracted[t] 402e). Concurrent aspect 200 also sets property 402d, max_potential_value to be the difference of property 402d, max_potential_value and property 402e, amt_added [t] (or, max_potential_value 402d ← max_potential_value 402d - amt_added[t] 402f). Concurrent aspect 200 also forwards the rollback message to serial aspect 202 so that serial aspect 202 may perform rollback processing.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A computer system for providing access to a scalar quantity, the computer system comprising:
    a concurrent aspect configured to provide access to the scalar quantity during one or more concurrent transactions, the concurrent aspect configured to construct a transaction record for each respective transaction, each transaction record including each request message received by the concurrent aspect and each response message sent by the concurrent aspect during a particular transaction; and
    a serial aspect configured to serially replay the transactions in which the concurrent aspect participates, the serial aspect configured to evaluate the integrity constraints evaluated by the concurrent aspect.
    wherein a particular transaction either commits if the replay of that transaction indicates that it will provide a consistent state or rollback if the replay of that transaction does not match the transaction record constructed by the concurrent aspect for that transaction.

2. A computer system as recited in claim 1 wherein the concurrent aspect and serial aspect each includes methods for setting a maximum and minimum allowed value for the scalar quantity.

3. A computer system as recited in claim 1 wherein the concurrent aspect and serial aspect each includes methods for adding to and subtracting from the value of scalar quantity.

4. A computer system as recited in claim 1 wherein the concurrent aspect and serial aspect each includes methods for setting and getting the value of the scalar quantity.

5. A computer system as recited in claim 1 further comprising a transaction record log and wherein the concurrent aspect is configured to respond to a prepare message received from a transaction manager by adding the transaction record corresponding to the prepare message to the transaction record log.

6. A computer system as recited in claim 1 wherein the concurrent aspect is configured to respond to a prepare message received from a transaction manager by forwarding the transaction record corresponding to the prepare message to the serial aspect, receipt of the transaction record acting as an implicit prepare message to the serial aspect.

7. A computer system as recited in claim 1 wherein the concurrent aspect is configured to rollback a transaction by undoing the effects of the transaction within the memory of the concurrent aspect.

8. A computer system as recited in claim 1 further comprising a passivated serial image, the passivated serial image including information usable to reconstruct the serial image in a between-transaction state.

9. A computer system as recited in claim 8 wherein the serial aspect is configured to restart after system failure, and to then recover its state using the passivated serial aspect and transaction record log.

10. A computer system as recited in claim 9 which, following recovery, assumes the role of the concurrent aspect.

11. A computer system as recited in claim 8 wherein the serial aspect is configured to rollback a transaction by aborting and recovering using the passivated serial image and transaction record log.

12. A method for providing access to a scalar quantity, the method comprising the steps, performed by a computer system, of:

constructing, by a concurrent aspect, one or more transaction records, each transaction record corresponding to a particular transaction, each transaction record including each request message received by the concurrent aspect during the transaction corresponding to that transaction record, each transaction record also including each response message sent by the concurrent aspect during the transaction corresponding to that transaction record;

replaying in sequence, by a serial aspect, the transactions that correspond to the transaction records constructed by the concurrent aspect; and causing, by the serial aspect, a transaction either to commit if the replay of that transaction provides an evaluation that the transaction will provide a consistent state or to rollback if the replay of that transaction does not match the transaction record constructed by the concurrent aspect for that transaction.

13. A method as recited in claim 12 further comprising the step, performed by the concurrent aspect, of registering with a transaction manager.

14. A method as recited in claim 12 further comprising the steps, performed by the concurrent aspect, of:

receiving a prepare message from a transaction manager, the prepare message corresponding to a particular transaction; and adding the transaction record corresponding to the particular transaction to a transaction record log.

15. A method as recited in claim 12 further comprising the steps, performed by the concurrent aspect, of, receiving a prepare message from a transaction manager, the prepare message corresponding to a particular transaction; and forwarding the transaction record corresponding to the particular transaction to the serial aspect, receipt of the transaction record acting as an implicit prepare message to the serial aspect.

16. A method as recited in claim 12 further comprising the step, performed by the concurrent aspect, of rolling back a transaction by undoing the effects of the transaction within the memory of the concurrent aspect.

17. A method as recited in claim 12 further comprising the step, performed by the serial aspect, of constructing a passivated serial image, the passivated serial image including information usable to reconstruct the serial image in a between-transaction state.

18. A method as recited in claim 17 further comprising the steps, performed by the serial aspect, of:

aborting the serial aspect;

creating a new serial aspect using the passivated serial image; and replaying each transaction included in the transaction record log.

19. A computer program product comprising:

a computer usable medium having computer readable code embodied therein for providing a scalar quantity for use in a computer system, the computer program product comprising:

a concurrent aspect including computer readable program code devices configured to cause a computer to provide access to a scalar quantity during one or more concurrent transactions, the concurrent aspect also including computer readable program code devices configured to cause a computer to construct a transaction record for each respective transaction, each transaction record including each request message received by the concurrent aspect and each response message sent by the concurrent aspect during a particular transaction; and a serial aspect including computer readable program code devices configured to cause a computer to serially replay the transactions in which the concurrent aspect participates, the serial aspect also including computer readable program code devices configured to cause a computer to commit the transaction if the replay of that transaction provides an evaluation that a transaction will provide a consistent state or to cause a computer or to rollback a transaction if the replay of that transaction does not match the transaction record constructed by the concurrent aspect for that transaction.

20. A computer program product as recited in claim 19 wherein the concurrent aspect includes computer readable program code devices configured to cause a computer to register the concurrent aspect with transaction managers as part of a two-phase commit protocol.

21. A computer program product as recited in claim 19 wherein the concurrent aspect includes computer readable program code devices configured to cause a computer to:

receive a prepare message from a transaction manager, the prepare message corresponding to a particular transaction; and add the transaction record corresponding to the particular fit transaction to a transaction record log.

22. A computer program product as recited in claim 19 wherein the concurrent aspect includes computer readable program code devices configured to cause a computer to:

receive a prepare message from a transaction manager, the prepare message corresponding to a particular transaction; and forward the transaction record corresponding to the particular transaction to the serial aspect, receipt of the transaction record acting as an implicit prepare message to the serial aspect.

23. A computer program product as recited in claim 19 wherein the concurrent aspect includes computer readable program code devices configured to cause a computer to rollback a transaction within the concurrent aspect by undoing the effects of the transaction within the memory of the concurrent aspect.

24. A computer program product as recited in claim 19 wherein the serial aspect includes computer readable program code devices configured to cause a computer to construct a passivated serial image, the passivated serial image including information usable to reconstruct the serial image in a between-transaction state.

25. A computer program product as recited in claim 24 wherein the serial aspect includes computer readable program code devices configured to cause a computer to rollback a transaction within the serial aspect by aborting the serial aspect, creating a new serial aspect using the passivated serial image, and replaying each transaction included in the transaction record log.

* * * * *